United States Patent [19]

Grissom

[11] Patent Number: 5,175,477
[45] Date of Patent: Dec. 29, 1992

[54] DIMMER FOR FLUORESCENT AND INCANDESCENT LAMPS

[76] Inventor: David Grissom, 802 Saybrook La., Houston, Tex. 77024

[21] Appl. No.: 767,869

[22] Filed: Sep. 30, 1991

[51] Int. Cl.⁵ .......................................... H05B 37/02
[52] U.S. Cl. .................... 315/291; 315/224; 315/DIG. 4
[58] Field of Search ............... 315/291, 199, 198, 205, 315/311, 119, 127, 209 R, 219, 224, DIG. 4, DIG. 7, 205, 200 R

[56] References Cited

U.S. PATENT DOCUMENTS

| | | | |
|---|---|---|---|
| 4,096,413 | 6/1978 | Alley | 315/291 |
| 4,207,498 | 6/1980 | Spira | 315/DIG. 4 |
| 4,277,728 | 7/1981 | Stevens | 315/291 |
| 4,894,587 | 1/1990 | Jungreis | 315/DIG. 4 |
| 4,928,038 | 5/1990 | Nerone | 315/307 |

*Primary Examiner*—Joseph A. Popek
*Assistant Examiner*—A. Zarabian
*Attorney, Agent, or Firm*—Kenneth A. Roddy

[57] ABSTRACT

A universal dimmer which can be used for both fluorescent lamps having a ballast and for incandescent lamps connected to either an alternating or direct current power supply. The dimmer can be installed in place of a standard wall-mounted light switch and connected to the existing wiring. The dimmer circuitry has a full-wave diode rectifier bridge connected in series with the lamp for converting the alternating current power into direct current. A variable current limiting circuit is connected in series with the DC output of the rectifier bridge and is powered by direct current to control the amount of current supplied through the lamp and ballast. The current limiting circuit includes a power transistor which acts as a variable resistor and controls the lamp current and an operational amplifier coupled with a voltage divider network that establishes a selectively variable reference voltage which controls the amount of current through the lamp. The fullwave rectifier bridge supplies a small amount of power to the control circuitry. The current limiting circuit allows continuous dimming control from full light output to zero output of both arc discharge lamps and incandescent lamps by limiting the current through the lamp without significantly reducing the electrical conduction angle of the alternating current power supply below 360 degrees and will also control dimming of systems powered by direct current.

18 Claims, 1 Drawing Sheet

DIMMER FOR FLUORESCENT AND INCANDESCENT LAMPS

BACKGROUND OF THE INVENTION

1. Field of the Invention

This invention relates generally to lamp dimmers, and more particularly to a universal dimmer which can be used with either fluorescent or incandescent lamps powered by alternating current or direct current.

2. Brief Description of the Prior Art

Most commercially available light dimmers utilize a switching circuit in series with the lights to be dimmed. These types of dimmers reduce the percentage of time the lights are on. For example, from 100% (full on) down to 0% (off). Their circuitry is designed to vary the electrical conduction angle. The electrical conduction angle is defined as the 360 degrees of a full cycle of 60 Hz (or other frequency) power line alternating voltage (usually sinusoidal). This is usually accomplished by either of two semiconductor switching devices known as a "triac" and a "silicon controlled rectifier" (SCR). Use of these switching devices demands the use of alternating current. They cannot cut off direct current.

The commercially available dimmers for incandescent lamps carry a warning against their use with fluorescent light fixtures. The reason being that fluorescent lamps have an inductive ballast in series with the lamp to limit current to a safe level. The current in an inductor cannot be changed instantaneously, and the switching devices of the incandescent lamp dimmers will produce large voltage spikes in the inductive ballast of an fluorescent lamp. They would also produce electromagnetic noise which would interfere with radio and television reception.

The common fluorescent lamp is a member of a family of very efficient light sources known as arc discharge lamps. The family of arc discharge lamps includes; fluorescents, mercury vapor, sodium vapor, xenon, and the so-called "neon" lamp. True neon is a generally red color, the other colors are some other type of gas. The mercury vapor lamps (blue-white) and sodium vapor lamps (orange) are commonly used as street lights and freeway lighting. All of these light sources require a high voltage to break down the conducting gas and, once the arc is established, there is nothing internal to the lamp to limit the current. Limiting of the current is accomplished with an external device known as a ballast. Most ballasts are of the inductive type to prevent dissipation of any more energy than is necessary.

The common fluorescent lamp is basically a mercury vapor lamp which some additional features. The fluorescent lamp differs from a mercury vapor lamp in that the mercury vapor lamp utilizes the visible light generated by the excited mercury gas, whereas the fluorescent lamp has a phosphor coating on the inside of the fluorescent tube which is made to glow as a result of the mercury light emission generated by the electrical arc. The mercury gas has a strong ultraviolet (UV) line which is not visible, and the phosphor coating in the fluorescent tube is excited to glow by the ultraviolet emission line. The light from the excited phosphor is added to the visible light emitted by the mercury vapor.

In all arc discharge lamps, the amount of light generated is a function of the current in the arc. The same is true of incandescent lamps, however, the incandescent lamp is a resistance device. Thus, to dim an incandescent lamp, one may limit the duty cycle of the current or limit the current, and to dim a fluorescent lamp, one must limit the current only, and in a smooth manner.

Electronic high frequency "switching ballasts" have recently been developed which, similar to the "SCR" type dimmers, limit the current conduction duty cycle. In the switching ballasts, the switching device is the ballast and there is no inductor where the current is switched in an uncontrolled manner. The switching ballasts are still too expensive for consumer use.

Special dimming circuits are available for fluorescent lamps which require special ballasts, special wiring, and a special control which mounts on the wall. The fixture is wired quite differently than the conventional home and office fixture. The special ballast is wired such that the voltage on the filaments extending between the two pins at each end of the tube is maintained constant while the current through the lamp is varied.

U.S. Pat. Nos. 3,935,505, 3,819,982, 3,614,527, and 3,358,187 disclose dimmers of the type which utilize a "triac" or a "silicon controlled rectifier" (SCR) semiconductor switching device and are designed to vary the electrical conduction angle. These types of dimmers cannot be used with conventional fluorescent ballasts.

U.S. Pat. No. 4,172,981 discloses a dimmer having a blocking oscillator to generate high frequency excitation and uses a transformer to step up the voltage to a level sufficient to arc the lamp. This device will not work with conventional ballasts and does not operate at the standard 60 Hz line frequency.

U.S. Pat. No. 3,264,518 discloses a dimmer which utilizes a saturable core reactor as the control element. The saturable core reactor is a transformer with DC windings which are used to saturate the magnetic core of the transformer and vary the inductive reactance. The variable source of DC current is supplied by SCR circuits.

The present invention is distinguished over the prior art in general, and these patents in particular by a universal dimmer which can be used for both fluorescent lamps having a ballast and for incandescent lamps connected to either an alternating or direct current power supply. The dimmer can be installed in place of a standard wall-mounted light switch and connected to the existing wiring. The dimmer circuitry has a fullwave diode rectifier bridge connected in series with the lamp for converting the alternating current power into direct current. A variable current limiting circuit is connected in series with the DC output of the rectifier bridge and is powered by direct current to control the amount of current supplied through the lamp and ballast. The current limiting circuit includes a power transistor which acts as a variable resistor and controls the lamp current and an operational amplifier coupled with a voltage divider network that establishes a selectively variable reference voltage which controls the amount of current through the lamp. The fullwave rectifier bridge supplies a small amount of power to the control circuitry. The current limiting circuit allows continuous dimming control from full light output to zero output of both arc discharge lamps and incandescent lamps by limiting the current through the lamp without significantly reducing the electrical conduction angle of the alternating current power supply below 360 degrees and will also control dimming of systems powered by direct current.

SUMMARY OF THE INVENTION

It is therefore an object of the present invention to provide a dimmer which can be used for either fluorescent or incandescent lamps whether powered by alternating current or direct current.

It is another object of this invention to provide a dimmer which can be used for fluorescent lamps having a standard inductive or other type of ballast and for incandescent lamps.

Another object of this invention is to provide a dimmer which allows continuous dimming control from full light output to zero output of both arc discharge lamps and incandescent lamps by limiting the current through the lamp without significantly reducing the electrical conduction angle below 360 degrees.

Another object of this invention is to provide a dimmer for use with either fluorescent or incandescent lamps which is easily and quickly installed in place of a standard wall-mounted light switch and connected to the existing wiring.

Another object of this invention is to provide a dimmer for use with either fluorescent or incandescent lamps which does not use a semiconductor switching device requiring AC power for operation such as a silicon controlled rectifier or a triac.

A further object of this invention is to provide a dimmer for use with either fluorescent or incandescent lamps which will not produce electromagnetic noise nor interfere with radio and television reception.

A still further object of this invention is to provide a dimmer for use with either fluorescent or incandescent lamps which is simple in construction, economical to manufacture, and reliable in use.

Other objects of the invention will become apparent from time to time throughout the specification and claims as hereinafter related.

The above noted objects and other objects of the invention are accomplished by a universal dimmer which can be used for both fluorescent lamps having a ballast and for incandescent lamps connected to either an alternating or direct current power supply. The dimmer can be installed in place of a standard wall-mounted light switch and connected to the existing wiring. The dimmer circuitry has a fullwave diode rectifier bridge connected in series with the lamp for converting the alternating current power into direct current. A variable current limiting circuit is connected in series with the DC output of the rectifier bridge and is powered by direct current to control the amount of current supplied through the lamp and ballast. The current limiting circuit includes a power transistor which acts as a variable resistor and controls the lamp current and an operational amplifier coupled with a voltage divider network that establishes a selectively variable reference voltage which controls the amount of current through the lamp. The fullwave rectifier bridge supplies a small amount of power to the control circuitry. The current limiting circuit allows continuous dimming control from full light output to zero output of both arc discharge lamps and incandescent lamps by limiting the current through the lamp without significantly reducing the electrical conduction angle of the alternating current power supply below 360 degrees and will also control dimming of systems powered by direct current.

DESCRIPTION OF A PREFERRED EMBODIMENT

Figure 1:
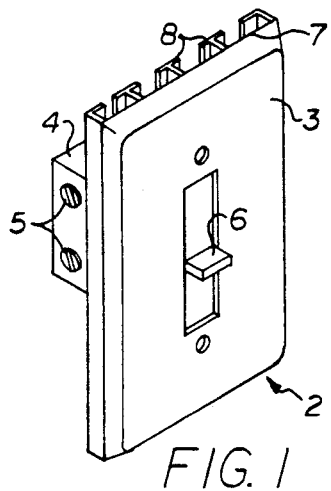
FIG. 1 is an isometric view of a dimmer control.

Referring to the drawing figure by numerals of reference, there is shown in FIG. 1, a preferred dimmer 2 for fluorescent and incandescent lamps. The dimmer 2 has a face plate 3 which is the same size as a conventional wall light switch face plate and is mounted on a conventional wall switch box. The present dimmer is designed to replace a standard wall-mounted light switch. The dimmer control circuitry is contained in a box-like housing 4 on the back side of the face plate. Screw connections 5 are provided on the housing 4 for connecting the dimmer to the existing light wiring. In the illustrated example, the dimmer has a slide type potentiometer switch 6 for on-off and dimming control, but may also be of the rotary knob type having an on-off position and a variable dimming range of positions.

In some installations, a thin heat sink plate 7 may be flush mounted on the back side of the face plate 3 and connected to the main control element of the control circuitry contained in the housing to provide cooling of the main control element. The heat sink plate 4 may also be provided with fins 8 to facilitate transferring heat to the room air.

Figure 2:
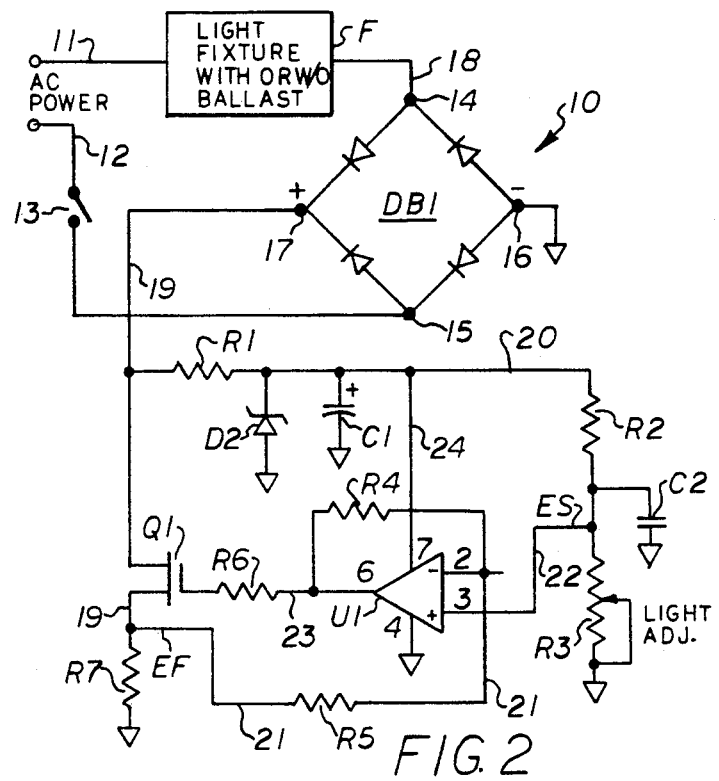
FIG. 2 is an electrical schematic diagram of a dimmer control circuit for fluorescent and incandescent lamps in accordance with the present invention.

Referring now to FIG. 2, there is shown an electrical circuit diagram of a preferred dimmer control circuit 10 for fluorescent and incandescent lamps. A light fixture F is connected to a source of AC or DC power by lead 11. A fullwave diode bridge DB1 is connected by lead 12 to the power source through an on-off light switch 13 installed between the power source and the diode bridge DB1. The switch 13 controls power to the series combination of the diode bridge DB1 and the lamp F. It should be understood that because the present circuitry can reduce the current to zero, thus extinguishing the lamp, that the on-off switch 13 is not a necessary component for operation.

Direct current is used for lighting in various parts of the world. Because the power transistor 19 is voltage controlled, the dimmer will control the brightness of direct current powered lighting. Fullwave diode bridge DB1 merely makes the dimmer circuit insensitive to the connection polarity when used with direct current power. Because switching devices, such as SCRs and triacs which are found in conventional alternating current systems depend upon the reversal of current direction to switch off, dimming systems using SCR and triac switching devices will only work with alternating current. The present dimmer on the other hand, will work equally as well in alternating or direct current systems.

The fullwave diode bridge DB1 has two pairs of series connected diode rectifiers connected on opposite sides of the bridge and has diagonally opposite pairs of terminals 14, 15 and 16, 17. The input terminal 14 is connected to the light fixture F by lead 18 and the lead 12 from the on-off switch 13 (or AC or DC power) is connected to the input terminal 15. The negative output terminal 16 is the control circuit common. The positive output terminal 17 is connected to the dimmer circuitry by lead 19. The function of the fullwave diode bridge DB1 is to force the current through the dimmer control circuitry in only one direction. The diode bridge DB1 produces unidirectional DC current flow for powering the control circuitry which is connected in series with the light fixture F through which AC current may still flow in AC installations.

Lead 19 (positive diode bridge output) is connected to a power transistor Q1 which may be mounted on a heat sink and a resistor R7 is connected between the transistor and circuit common. Power transistor Q1 acts as a variable resistor in series with the light fixture F while the resistor R7 senses the current in the transistor Q1. Power transistor Q1 is the main control element and controls the light fixture current.

A lead 20 is connected to lead 19 between the diode bridge DB1 and the power transistor Q1. Resistor R1, resistor R2, and variable control resistor R3 (a potentiometer) are connected in series in the lead 20 and connected to circuit common. Zener diode D2 and capacitor C1 are connected to circuit common between resistors R1 and R2. Capacitor C2 is connected to circuit common between resistors R2 and R3. The components R1, C1, and D2 form a small DC power supply which supplies a small amount of power to the control circuitry.

The on-off switch 13 and the variable control resistor R3 may be incorporated into a single unit and operated together, for example, as a rotatable control knob of the type having an on-off position and a variable dimming range of positions.

A lead 21 is connected to lead 19 between the power transistor Q1 and the resistor R7 and is connected to the amplifier U1 (described hereinafter) through resistor R5.

The power transistor Q1 is controlled by either a discrete or integrated circuit amplifier. In the preferred embodiment, an operational amplifier or "op-amp" U1 is used. The op-amp U1 has its non-inverting (+) input pin 3 connected by lead 22 to lead 20 between the resistor R2 and the variable control resistor R3. The inverting (−) input pin 2 of the op-amp U1 is connected to lead 21. The op-amp output pin 6 is connected through resistor R6 to power transistor Q1 by lead 23. The inverting (−) input pin 2 of the op-amp U1 is connected through resistor R4 to the lead 23 between the output pin 6 and the resistor R6. The negative supply pin 4 of the op-amp U1 is connected to circuit common and the positive supply pin 7 connected by lead 24 to the lead 20 between the resistor R1 and the resistor R2. Power transistor Q1, resistor R7, op-amp U1 and the associated resistors R4, R5, and R6 form a constant current feedback loop. The resistor R2 and the variable control resistor R3 form a voltage divider network.

The feedback voltage Ef across R7 is inverted in the amplifier formed by op-amp U1 and resistors R4 and R5 and is fed back into the control input of the power transistor Q1. The resistor R6 isolates the op-amp output from the large input capacity of power transistor Q1 and prevents oscillation in the op-amp U1. A reference voltage Es is established at the non-inverting (+) input pin 3 of op-amp U1 by voltage divider network R2 and R3. Since control resistor R3 is variable, the reference voltage Es can be changed so as to control the amount of current through the light fixture F. The capacitor C2 serves as a noise filter to keep the control current steady.

The resistor R1, capacitor C1, and zener diode D2 form a small DC power supply for the op-amp U1 and the reference voltage Es. A small amount of the line voltage is robbed from the light fixture F in order to supply the small amount of power required for the control circuitry.

DESCRIPTION OF ANOTHER PREFERRED EMBODIMENT

Figure 3:
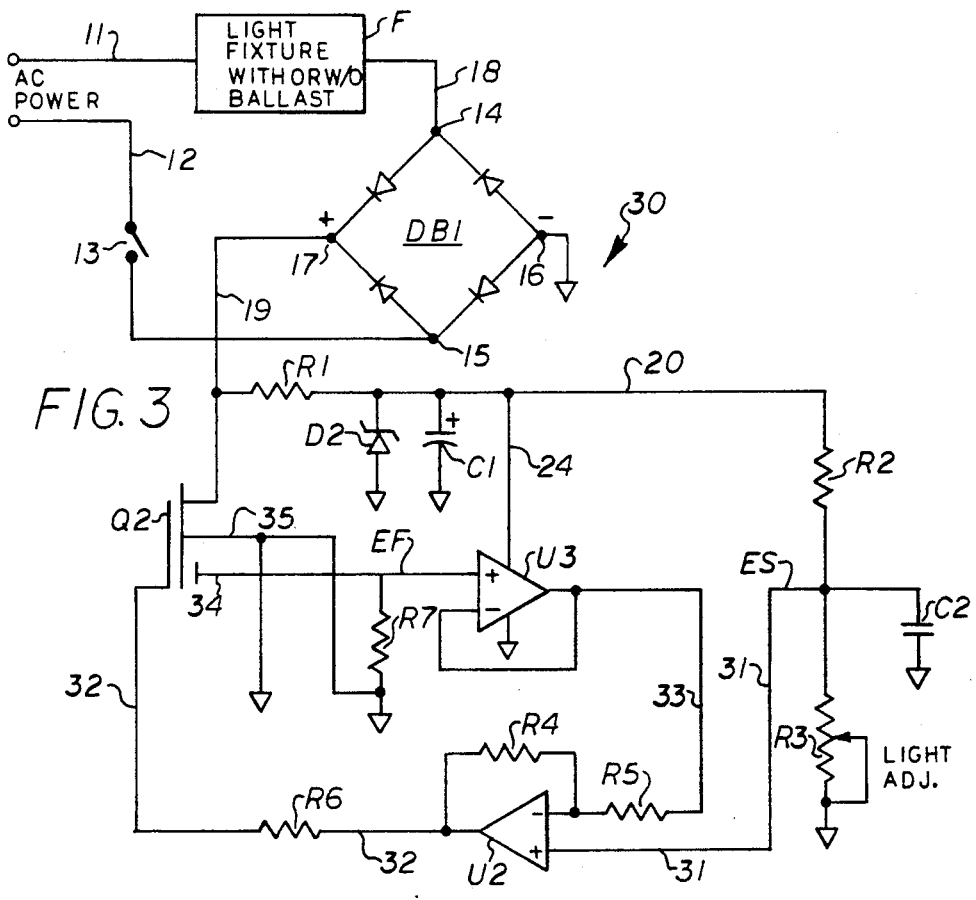
FIG. 3 is an electrical schematic diagram of another embodiment of the control circuit for fluorescent and incandescent lamps in accordance with the present invention.

Referring now to FIG. 3, there is shown an electrical circuit diagram of another preferred dimmer circuit 30 for fluorescent and incandescent lamps wherein the control circuitry utilizes a current sensing field-effect transistor (CSFET) coupled with an op-amp and buffer amp system.

As in the previously described embodiment, the light fixture F is connected to a source of AC or DC power by lead 11. A fullwave diode bridge DBI is connected by lead 12 to the source through an on-off light switch 13 installed between the power source and the diode bridge DB1. The switch 13 controls power to the series combination of the diode bridge DB1 and the lamp F. As discussed above, the present circuitry can reduce the current to zero, thus extinguishing the lamp, and the on-off switch 13 is not a necessary component for operation.

The fullwave diode bridge DBI has two pairs of series connected diode rectifiers connected on opposite sides of the bridge and has diagonally opposite pairs of terminals 14, 15 and 16, 17. The input terminal 14 is connected to the light fixture F by lead 18, and the lead 12 from the on-off switch 13 (or AC or DC power) is connected to the input terminal 15. The negative output terminal 16 is the control circuit common. The positive output terminal 17 is connected to the dimmer circuitry by lead 19. The fullwave diode bridge DB1 forces the AC current through the dimmer control circuitry in only one direction. The diode bridge DBI produces unidirectional DC current flow for powering the control circuitry which is connected in series with the light fixture F through which AC current may still flow in AC powered systems.

Lead 19 (positive diode bridge output) is connected to a CSFET (current sensing field-effect transistor) Q2. Transistor Q2 is the main control element and controls the light fixture current.

A lead 20 is connected to lead 19 between the diode bridge DB1 and the CSFET transistor Q2. Resistor R1, resistor R2, and variable control resistor R3 are connected in series in the lead 20 and connected to circuit common. Zener diode D2 and capacitor C1 are connected to circuit common between resistors R1 and R2. Capacitor C2 is connected to circuit common between resistors R2 and R3. The components R1, C1, and D2 form a small DC power supply for the amplifier system (described hereinafter) which supplies a small amount of power to the control circuitry.

In the embodiment of FIG. 3, a pair of "op-amps" U2 and U3 are used to control the CSFET transistor Q2. The op-amp U2 has its non-inverting (+) input pin connected by lead 31 to lead 20 between the resistor R2 and the variable control resistor R3. The output pin of op-amp U2 is connected through resistor R6 to CSFET power transistor Q2 by lead 32. The inverting (−) input pin of the op-amp U2 is connected through resistor R5 to output pin of the op-amp U3 by lead 33 between the op-amp output pin and the resistor R6. The inverting (−) input pin of the op-amp U2 is also connected through resistor R4 to the lead 32 between the op-amp output pin and the resistor R6.

A current tap lead 34 is connected between the CSFET power transistor Q2 and the non-inverting (+) input pin of the op-amp U3. A current sensing resistor R7 is connected to current tap lead 34 between the transistor Q2 and op-amp U3 and to circuit common. A lead 35 is connected between transistor Q2 and current sensing resistor R7 and to circuit common. The inverting (−) input pin of the op-amp U3 is also connected to lead 33 between the op-amp output pin and the resistor R5. The negative supply pin of the op-amp U3 is connected to circuit common and its positive supply pin is connected by lead 24 to the lead 20 between the resistor R1 and the resistor R2.

CSFET power transistor Q2, resistor R7, op-amps U2 and U3, and the associated resistors R4, R5, and R6 form a constant current feedback loop. Transistor Q2 is the power transistor and acts as a variable resistor in series with the light fixture F while the resistor R7 senses the current in the transistor Q2. Op-amp U3 serves as a buffer amplifier. The resistor R2 and the variable control resistor R3 form a voltage divider network.

The feedback voltage Ef across R7 is inverted in the amplifier system formed by op-amps U2 and U3 and resistors R4 and R5 and is fed back into the control input of the power transistor Q2. A reference voltage Es is established at the non-inverting (+) input pin of op-amp U2 by voltage divider network R2 and R3. Since control resistor R3 is variable, the reference voltage Es can be changed so as to control the amount of current through the light fixture F. The capacitor C2 serves as a noise filter to keep the control current steady.

The resistor R1, capacitor C1, and zener diode D2 form a small DC power supply for the op-amps U2 and U3 and the reference voltage Es. A small amount of the line voltage is robbed from the light fixture F in order to supply the small amount of power required for the control circuitry.

In the embodiment of FIG. 2, the current sensing resistor R7 has to be a high wattage power resistor. By use of the CSFET transistor Q2 in the embodiment of FIG. 3, only a small fraction of the total drain current (which is the same as the light fixture current) need be sent through a resistor to generate a voltage proportional to the light fixture current. The feedback voltage Ef, is developed across R7 as before, but the value of resistor R7 can be several thousand ohms instead of a fraction of an ohm and the size can be a fraction of a watt rather than several watts. Thus, heat dissipation and space are saved. Op-amps U2 and U3 may also be in the same package to save space. It should be understood, that if the values of R4, R5, and R7 are carefully chosen, the lamp U3 may not be required.

OPERATION

When the switch 13 is turned on, or power otherwise applied, the voltage Ef across resistor R7 reaches a value in the vicinity of the reference voltage Es, the power transistor Q1 (or Q2) is forced into current limiting operation to prevent the current from rising beyond a certain value. The current limiting function is dynamic and is only applied when the fixture current reaches a value set by the variable control resistor R3. The current limiting value is determined by the reference voltage Es which is variable. The reference voltage Es can be set by hand, thus giving the user control over the current through the light fixture and the resulting emitted light. The current control range is also, established by the value of R7.

When there is no current through the resistor R7, the voltage output at the output pin of the op-amp U1 (or U2) is driven to the power supply voltage (such as +14V) which turns on the power transistor Q1 (or Q2) very hard.

In alternating current systems, the line voltage (for example 115 V AC 60 Hz) alternates polarity at 60 times per second, the current in the light fixture does the same. Thus, the fixture current is caused to go through zero 120 times per second. The fixture current is not limited near the zero crossings, and the dimmer circuit is essentially disabled. During the zero crossing portions of the cycle, the light fixture senses normal voltage. If the fixture is of the arc discharge type (fluorescent having a ballast) it will sense normal voltage during the zero crossings of the cycle which allows the ballast to function normally to keep the filaments warm if necessary to maintain the arc.

As long as the light fixture is not dimmed excessively, the filament warmth is maintained by the arc current itself and filament heat is not required. When the fixture is dimmed to near cut-off, some filament heat is required and this is provided by the dimmer circuit.

Thus, the present dimmer provides continuous dimming control from full light output to zero output of both arc discharge lamps and incandescent lamps by limiting the current through the lamp without reducing the electrical conduction angle below 360 degrees (except for a very small amount of angle which may be produced by non-ideal diodes near the zero voltage axis crossings).

It should be understood, that the control transistors Q1 or Q2 may be of the bipolar type rather than the field effect type as shown and that the control amplifiers may be of the hybrid, discrete component, or vacuum tube type rather than an IC. It should also be understood that because the present circuitry can reduce the current to zero, thus extinguishing the lamp, that the on-off switch is not a necessary component for operation.

While this invention has been described fully and completely with special emphasis upon a preferred embodiment, it should be understood that within the scope of the appended claims the invention may be practiced otherwise than as specifically described herein.

I claim:

1. A universal brightness control circuit for both arc discharge lamps having a ballast and for incandescent lamps connected to a source of electrical power comprising:

rectifier means connected in series between the source of electrical power and the lamp for converting the electrical power into direct current, and variable dimming control means connected to the output of said rectifier means and powered by the converted direct current to control the amount of current supplied through the lamp or ballast without significantly reducing the full 360° conduction angle of the electrical power supply.

2. A universal brightness control circuit according to claim 1 in which said rectifier means comprises a fullwave diode bridge having a first input terminal connected to the lamp or ballast, a second input terminal connected to the source of electrical power, a first common output terminal, and a second output terminal connected to said variable dimming control means for supplying direct current thereto, and said variable dimming control means having variable resistor means and amplifier means coupled with a voltage divider network which establishes a selectively variable reference voltage to selectively control the amount of current supplied through the lamp or ballast without significantly reducing the full 360° conduction angle of the electrical power supply.

3. A universal brightness control circuit according to claim 2 including switch means connected between the source of electrical power and the lamp on either side of the source of electrical power, and said fullwave diode bridge having said first input terminal connected to the lamp and ballast, said first common output terminal, and said second output terminal connected to said variable dimming control means for supplying direct current thereto.

4. A universal brightness control circuit according to claim 1 in which said current controlling means is a constant current generator.

5. A universal brightness control circuit according to claim 1 in which said electrical power source is alternating current, and said current controlling means is variable with the current level in said lamp or ballast to be inactive when the lamp current is below a predetermined limit for normal or undimmed operation during low current portions of the alternating current cycle to allow heating of the lamp filaments and establish an arc whether or not the arc discharge lamp is of the filament type.

6. A universal brightness control circuit for both arc discharge lamps having a ballast and for incandescent lamps connected to a source of electrical power comprising;

rectifier means connected in series between the source of electrical power and the lamp or ballast for converting the electrical power into direct current, said rectifier means comprises a fullwave diode bridge having a first input terminal connected to the lamp or ballast, a second input terminal connected to the source of electrical power, a first common output terminal, and a second output terminal connected to said variable dimming control means for supplying direct current thereto.

variable dimming control means connected to the output of said rectifier means and said lamp and powered by the converted direct current, said variable dimming control means includes a current limiting power transistor which acts as a variable resistor, and an operational amplifier coupled with a voltage divider network which establishes a selectively variable reference voltage to selectively control the amount of current supplied through the lamp or ballast without significantly reducing the full 360° conduction angle of the electrical power supply.

7. A universal brightness control circuit according to claim 6 in which the positive output of said fullwave diode bridge is connected to said power transistor in series, and said power transistor is connected to circuit common through a first resistor which senses the current in said power transistor.

8. A universal brightness control circuit according to claim 7 in which said power transistor is mounted on a heat sink and connected to circuit common through said first resistor which senses the current in said power transistor.

9. A universal brightness control circuit according to claim 7 including:

a second resistor, a third resistor, and a variable control resistor connected in series and to circuit common and connected between said fullwave diode bridge positive output and said power transistor, a zener diode and a first capacitor connected between said second and said third resistors and to circuit common, a second capacitor connected between said third and said variable control resistors and to circuit common, and said operational amplifier having a positive supply pin connected between said second resistor and said third resistor, whereby said second resistor, said zener diode, and said first capacitor form a small direct current power supply for said operational amplifier.

10. A universal brightness control circuit according to claim 10 in which said second capacitor serves as a noise filter to maintain the controlled amount of current steady.

11. A universal brightness control circuit according to claim 10 in which said power transistor prevents the amount of current to the lamp from rising beyond a selected value when the voltage across aid first resistor reaches a value in the vicinity of said reference voltage selected by said variable control resistor.

12. A universal brightness control circuit according to claim 9 including switch means connected between the source of electrical power and the lamp, and said switch means and said variable control resistor are a single unit and operated together to manually turn the electrical power on or off and control the variable dimming range of the lamp.

13. A universal brightness control circuit according to claim 9 in which said operational amplifier has a negative supply pin connected to circuit common, said positive supply pin is connected between said second resistor and said third resistor, a non-inverting positive input pin connected between said third resistor and said variable control resistor, an output pin connected through a fourth resistor to said power transistor, an inverting negative input pin connected between said power transistor and said first resistor through a fifth resistor and through a sixth resistor between said amplifier output pin and said fourth resistor, said power transistor, said first resistor, said operational amplifier and sad fourth, fifth, and sixth resistors form a constant current circuit, and said third resistor and said variable control resistor forming a voltage divider network, whereby the voltage across said first resistor is inverted and is fed back into the control input of said power transistor and said fourth resistor isolates said operational amplifier output from said power transistor input capacity and limits the input control current into said power transistor.

14. A universal brightness control circuit according got claim 13 in which
said voltage divider network formed by said third resistor and said variable control resistor establishes a reference voltage at the non-inverting positive input pin of said operational amplifier which is selectively variable by said variable control resistor to control the amount of current through said lamp.

15. A universal brightness control circuit according to claim 13 in which
said power transistor, said first resistor, said operational amplifier and said fourth, fifth, and sixth resistors form a constant current feedback loop circuit.

16. A universal brightness control circuit according got claim 9 in which
said power transistor is a current sensing transistor,
said operational amplifier comprises a first and a second operatoinal amplifier,
said first operational amplifier has a non-inverting positive input pin connected between said third resistor and said variable control resistor, a first output pin connected through a fourth resistor to said current sensing power transistor, an inverting negative input pin connected through a fifth resistor to a first output pin of said second operational amplifier and through a sixth resistor between said first operational amplifier first output pin and said fourth resistor,
said second operational amplifier first output pin is connected through said fifth resistor to the inverting negative input pin of said first operational amplifier and has an inverting negative input pin connected between said first output pin and said fifth resistor, a non-inverting positive input pin connected between a current sensing terminal of said current sensing power transistor and to circuit common through said first resistor, a negative supply pin connected to circuit common, and a positive supply pin connected between said second resistor and said third resistor,
said current sensing power transistor, said first resistor, said first and second operational amplifiers, and said fourth, fifth, and sixth resistors form a constant current circuit, and
said third resistor and said variable control resistor forming a voltage divider network, whereby the voltage across said first resistor is inverted and is fed back into the control input of said current sensing power transistor and said fourth resistor isolates said first operational amplifier output from said power transistor input capacity and limits the input control current into said power transistor.

17. A universal brightness control circuit according to claim 16 in which
said voltage divider network formed by said third resistor and said variable control resistor establishes a reference voltage at the non-inverting positive input pin of said first operational amplifier which is selectively variable by said variable control resistor to control the amount of current through said lamp.

18. A universal brightness control circuit according to claim 16 in which
said current sensing power transistor, said first resistor, said first and second operational amplifiers and said fourth, fifth, and sixth resistors form a constant current feedback loop circuit.

* * * * *